ATTENUATOR

Filed June 15, 1962 4 Sheets-Sheet 1

INVENTOR.
HAROLD MOREINES
BY [signature]
ATTORNEY

INVENTOR.
HAROLD MOREINES
BY
ATTORNEY

INVENTOR.
HAROLD MOREINES
BY [signature]
ATTORNEY

ATTENUATOR

Filed June 15, 1962

INVENTOR.
HAROLD MOREINES
BY
ATTORNEY

United States Patent Office 3,217,241
Patented Nov. 9, 1965

3,217,241

ATTENUATOR

Harold Moreines, Springfield, N.J., assignor to The Bendix Corporation, Teterboro, N.J., a corporation of Delaware Filed June 15, 1962, Ser. No. 202,846
19 Claims. (Cl. 323—69)

This invention relates to self-calibrating voltage controlled attenuators and more particularly to a system for controlled attenuation of a suppressed carrier modulated voltage by electronic means utilizing an attenuated D.C. voltage output as a self-calibrating feedback control for the system.

A problem which is commonly encountered in flight control systems is that of varying channel gain as the product function of one or more independent variables. In the past this problem has been overcome generally by using systems which employed mechanically driven potentiometers requiring precision servos and subject to wiper noise, unreliability, etc. This invention provides the aforementioned gain variation without the attendant problems that formerly existed.

Therefore, one object of this invention is to provide an attenuator for attenuating data-modulated suppressed carrier signals whereby the attenuation factor is precisely controlled with a D.C. voltage.

Another object of this invention is to provide a voltage controlled attenuator which preserves the signal waveform and phase in the output voltage.

Another object of this invention is to provide a voltage controlled attenuator having a large range of controllable resistance thereby enabling use of wide range gain adjustments.

Another object of this invention is to provide a stable, self-calibrating voltage controlled attenuator having a substantially flat transmission characteristic.

Another object of this invention is to provide a voltage controlled attenuator wherein average power dissipated in the attenuator is held to a minimum through use of pulse modulation.

The invention contemplates self-calibrating attenuator for attenuating a signal by a factor K, comprising a pair of series connected thermistors receiving a signal, means connected to a junction between the thermistors for providing an attenuated output, a heater associated with each of the thermistors, and means responsive to the attenuated output for controlling energizaion of the heaters to vary the resistance ratio of the thermistors.

The foregoing and other objects and advantages of the invention will appear more fully hereinafter from a consideration of the detailed description which follows, taken together with the accompanying drawings wherein two embodiments of the invention are illustrated. It is to be expressly understood, however, that the drawings are for purposes of illustration and description only, and are not to be construed as defining the limits of the invention.

Figure 1:
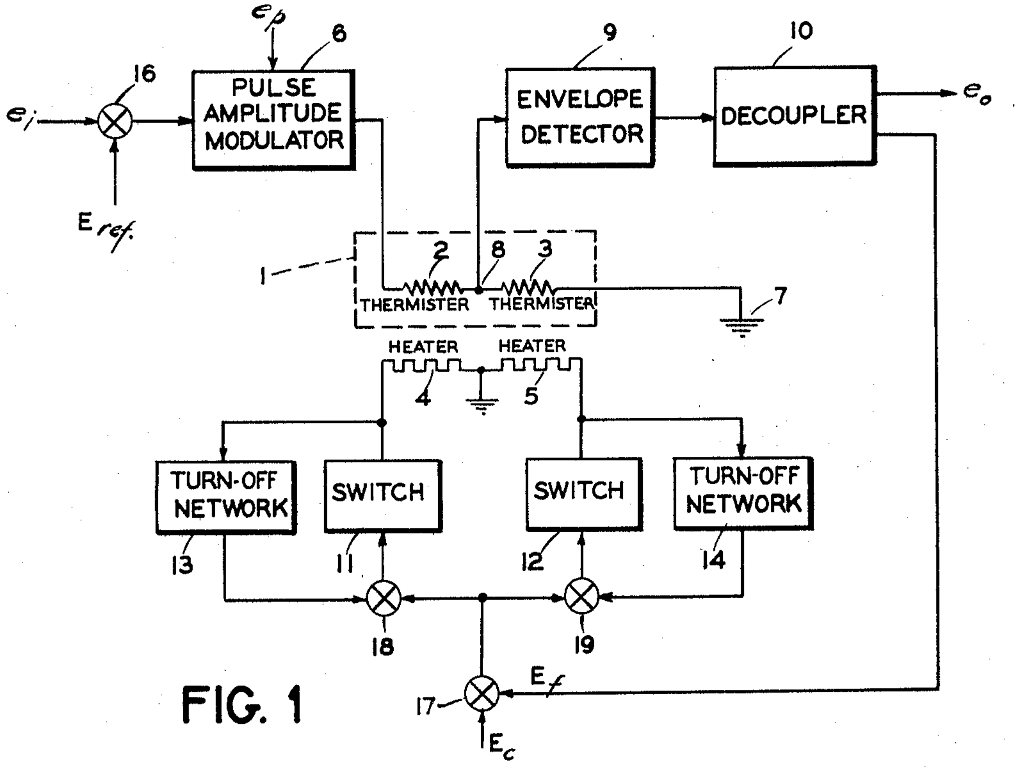
FIGURE 1 is a schematic diagram of one embodiment of a voltage controlled attenuator constructed according to the invention.
Figure 3:
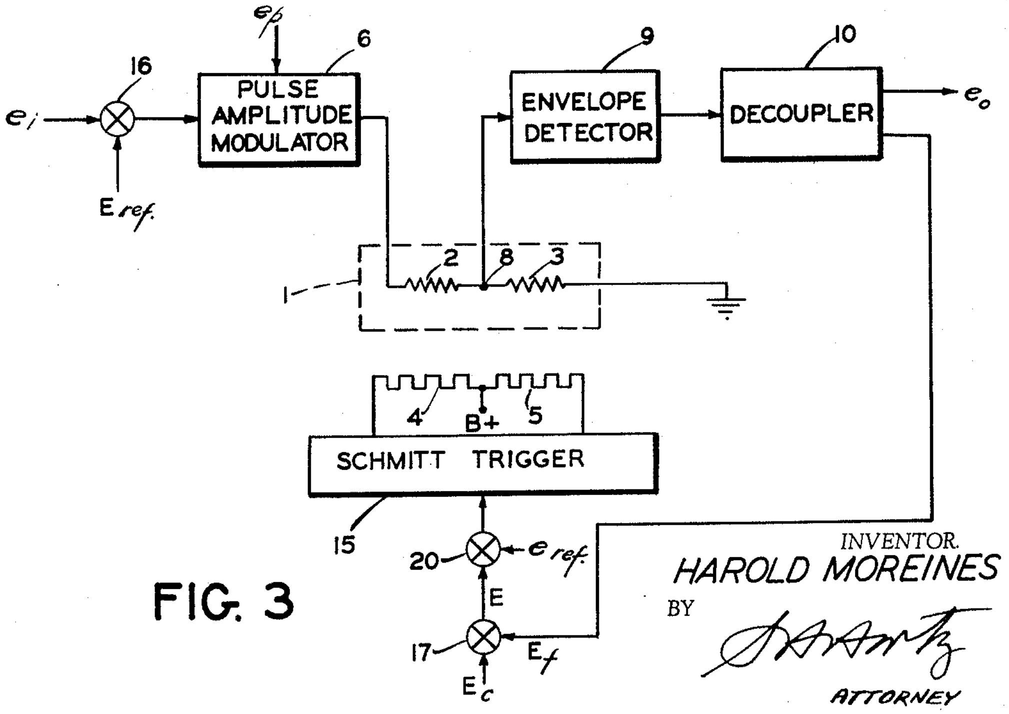
FIGURE 3 is a schematic diagram of another embodiment of a voltage-controlled attenuator constructed according to the invention.

FIGURES 4*a*, 4*b*, 4*c*, 4*d* and 4*e* are voltage waveforms which illustrate operation of the circuit of FIGURES 1 and 3.

Figure 5A:
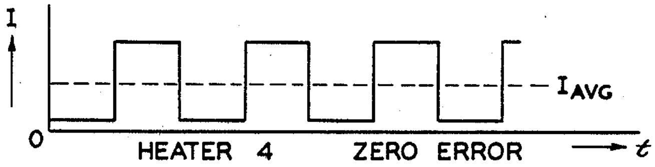
Figure 5B:
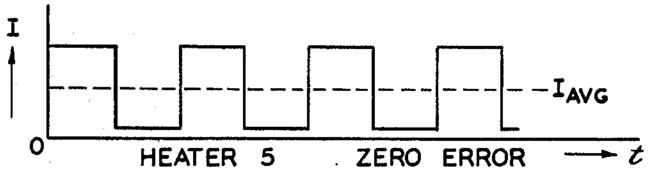

FIGURES 5*a* and 5*b* are current waveforms which illustrate operation of the circuit of FIGURE 3 when the commanded attenuation factor equals the measured attenuation factor.

Figure 6A:
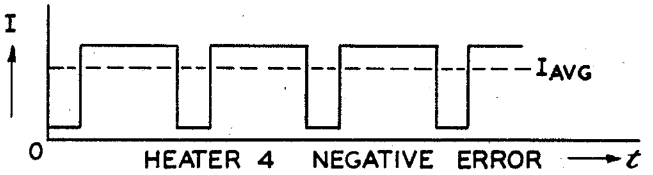
Figure 6B:
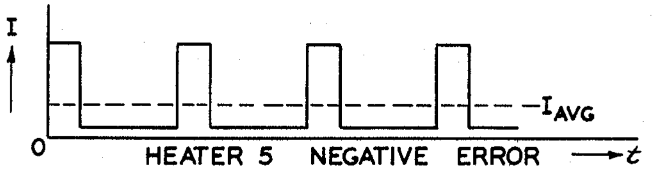

FIGURES 6*a* and 6*b* are current waveforms which illustrate operation of the circuit of FIGURE 3 when the commanded attenuation factor is greater than the measured attenuation factor.

Figure 7A:
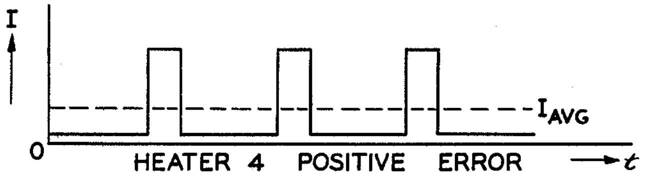
Figure 7B:
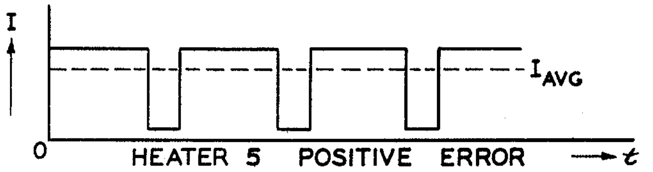

FIGURES 7*a* and 7*b* are current waveforms which illustrate operation of the circuit of FIGURE 3 when the commanded attenuation factor is less than the measured attenuation factor.

Figure 8:
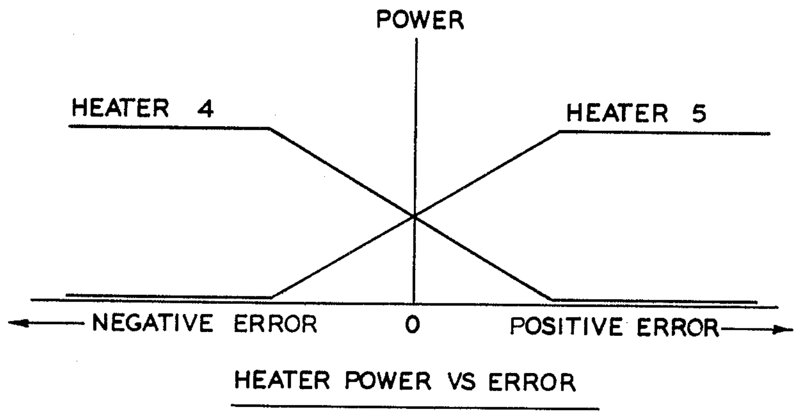

FIGURE 8 is a graphical illustration of power correction applied to the attenuator of FIGURE 3.

Referring to the drawings for a more detailed description of the invention, FIG. 1 shows a novel resistive attenuator network 1, comprising a pair of temperature responsive resistors, such as thermistors 2 and 3, connected in series between the output of a pulse amplitude modulator 6 and 7. Thermistors 2 and 3 are similar to each other, although they are not necessarily matched. The temperatures of thermistors 2 and 3 are controlled by heaters 4 and 5, respectively, thermistor 2 being associated with and in close proximity to heater 4, and thermistor 3 being associated with an in close proximity to heater 5.

Figure 4A:
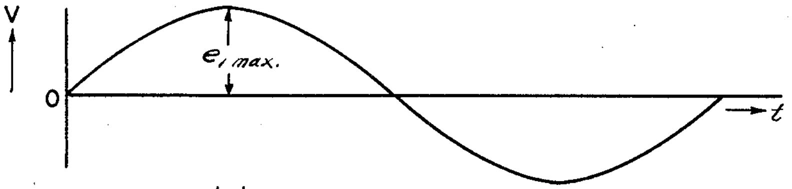

The pulse amplitude modulator 6 is adapted to receive two signals; a carrier signal $e_p$ in the form of a train of equally-spaced unidirectional pulses of constant amplitude, and a modulating signal comprising an input signal $e_i$ superimposed upon a D.C. references voltage $E_{ref}$ at a summing point 16. FIGURE 4*a* illustrates the waveform of input signal $e_i$. The amplitude of the unidirectional pulses is equal to the amplitude of reference voltage $E_{ref}$, which is itself selected so as to exceed the maximum expected amplitude of input signal $e_i$ in order to prevent overmodulation. Since $e_i$ is chosen to be a sinsuoidal voltage, the pulse train is amplitude-modulated in modulator 6 at a frequency equal to that of signal $e_i$. Because $e_i$ is in turn modulated by the input data which controls its amplitude, input signal $e_i$ may be regarded as a subcarrier superimposed upon carrier signal $e_p$. It should also be noted that although signal $e_i$ may be of any frequency, a 400 cycle frequency has been found to provide excellent results, and such power generally is available aboard aircraft.

An envelope detector 9 is connected between a junction point 8 common to thermistors 2 and 3, and a decoupler 10 which provides an output signal $e_o$ and a D.C. feedback voltage $E_f$. This feedback voltage is differentially compared with an attenuation command voltage $E_c$ at a summing point 17 to provide an error voltage E of positive or negative polarity. The error voltage is applied through a pair of summing points 18 and 19 to a pair of transistor switches 11 and 12 to energize heaters 4 and 5 depending upon the polarity of error voltage E. Switch 11 controls current flow through heater 4 when error voltage E is of one polarity, and switch 12 controls current flow through heater 5 when error voltage E is of opposite polarity. It should be noted that magnetic switches may be used satisfactorily instead of transistor switches.

Because there exists an inherent thermal lag between the time that heater power is applied and the time that the resultant change in thermistor resistance occurs, circuit stability can be enhanced by the addition of delayed feedback around the switches 11 and 12 as turn-off controls. A turn-off network 13 is therefore connected in a feedback loop around switch 11 while a second turn-off network 14 is connected in a feedback loop around switch 12. This, in effect, permits current pulses to be applied to the heaters 4 and 5 with pulse duration varying as a function of the magnitude of error voltage E.

Figure 2:
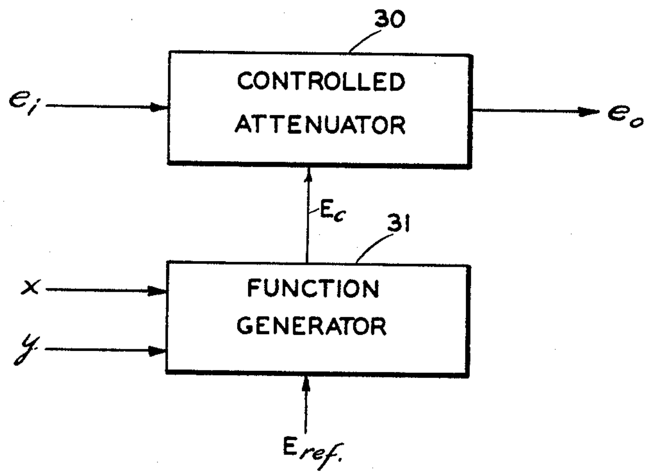
FIGURE 2 is a block diagram of a system for varying channel gain as a product function of two independent variables and which employs the novel voltage-controlled attenuator of the present invention.

FIG. 2 shows the controlled attenuator 30, which is shown in detail in the schematic diagram of FIG. 1, connected to a function generator 31. The function generator 31 receives the D.C. reference voltage $E_{ref}$, and voltages corresponding to a pair of independent variables $x$ and $y$. The function generator provides a D.C. attenuation command voltage $E_c$ such that $$E_c = KE_{ref}$$

where $K=f(x,y)$ and represents the desired or commanded attenuation factor of the controlled attenuator. The controlled attenuator processes input voltage $e_i$ such that $$\frac{e_o}{e_i} = K_1 \text{ and } K_1 = K$$

where $e_o$ is the output voltage of the circuit and $K_1$ is the measured attenuation factor of the controlled attenuator. Since channel gains greater than unity may be obtained by use of external cascaded amplifiers, the attenuation factor K need only range between zero and unity as $E_c$ varies between zero and $E_{ref}$.

Figure 4B:
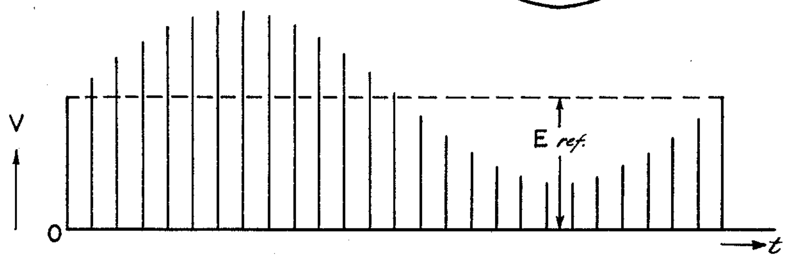
Figure 4C:
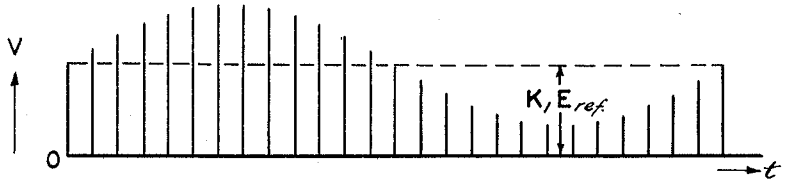

Referring again to FIG. 1 for a more detailed description of operation of the controlled attenuator, the input signal $e_i$ is combined with the D.C. voltage $E_{ref}$ at summing point 16 to provide the amplitude modulation signal for the carrier voltage $e_p$. Modulation of voltage $e_p$ takes place in the modulator 6, producing a train of amplitude modulated pulses as illustrated in FIG. 4*b*. These pulses are then applied to attenuator network 1, so that a portion of each pulse produced by modulator 6 appears across thermistor 2, and the remainder of each of the pulses appears across thermistor 3. The signal appearing across thermistor 3 is illustrated by the waveform of FIG. 4*c*.

The transmission characteristic of network 1 is essentially flat, since it is almost entiredly resistive in character. Thus the waveform produced by modulator 6 is preserved by network 1, but the amplitude of each individual pulse is attenuated by a factor $K_1$ determined by the resistance ratio of thermistor 2 to thermistor 3 during the pulse interval.

At this point it should be noted that the attenuation process could be performed without pulse modulation; that is, by applying $e_i + E_{ref}$ directly to the attenuator. However, the average power dissipated in the network for this method of operation would be prohibitively high due to self-heating of the thermistor elements. The use of pulse amplitude modulation wherein the pulse width is made small as compared with the pulse period permits operation of the thermistors with negligible self-heating.

Figure 4D:
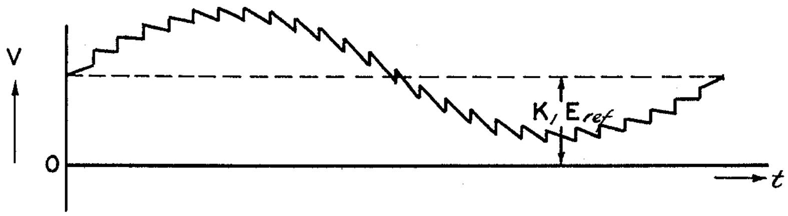

The attenuated signal produced by modulator 6, which appears at junction 8 between thermistors 2 and 3, is applied to envelope detector 9 which demodulates the signal by recovering the attenuated data modulated input signal of amplitude $K_1 e_i$ superimposed upon a D.C. component of amplitude $K_1 E_{ref}$. The signal produced by the envelope detector is illustrated by the waveform of FIG. 4*d*. The A.C. and D.C. components of this signal are separated in the decoupler 10 producing an A.C. component $e_o$ which is the output signal of the controlled attenuator, and a D.C component $E_f$, which is used as the attenuator feedback voltage. It should now be obvious the $e_o$ is an attenuated reproduction of $e_i$ such that $$\frac{e_o}{e_i} = K_1$$

Figure 4E:
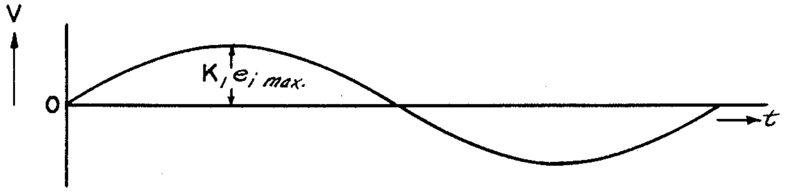

The waveform of A.C. component $e_o$ is shown in FIG. 4*e*.

The feedback voltage $E_f$ is used for calibration in the following manner. $E_f$ is differentially compared with the attenuation command voltage $E_c$ at summing point 17, resulting in error voltage E, which is positive when $E_f$ is less than $E_c$ and negative when $E_f$ is greater than $E_c$. These conditions correspond respectively to the inequalities for $K_1$ less than K and $K_1$ greater than K. Error voltage E is applied to switches 11 and 12 through summing points 18 and 19, respectively. Switch 11 permits current flow through heater 4 for negative error voltages exceeding the threshold of switch 11, and switch 12 permits current flow through heater 5 for positive error voltages exceeding the threshold of switch 12. In this manner the error is held within a zone bounded by the switching thresholds, and the measured gain $K_1$ is then very nearly equal to the desired gain K.

Referring next to FIG. 3, a second embodiment of the invention is shown wherein heaters 4 and 5 are controlled by a switch such as a Schmitt trigger circuit 15 which provides pulse-width modulated heater power in proportion to the attenuator error. This system differs from that of FIG. 1 in that Schmitt trigger 15 biases both heaters with equal power in the absence of an error signal E, by applying a sinusoidal signal $e_{ref}$ or other suitable periodic signal as a reference. The Schmitt trigger, as herein used, is a monostable multivibrator having a stable state (Off) for inputs below a reference level, and a quasi-stable state (On) for inputs above the reference level.

Alternating current bias signal $e_{ref}$ is chosen to have a zero average value, and thus the trigger circuit 15 is alternately turned On and Off for equal intervals of time. FIGURE 5*a* illustrates the wave form of current through heater 4 when there is no error signal applied to the Schmitt trigger circuit, while FIGURE 5*b* illustrates the wave form of the current applied through heater 5 under the same conditions. Under these circumstanecs, the average current through heater 4 equals the average current through heater 5. If the heaters have identical electrical characteristics, thermistors 2 and 3 will be heated equally, although this is not necessary for proper operation of the circuit. Addition of error signal E to the bias $e_{ref}$ at a summing point 20 increases the ratio of trigger circuit On time to Off time in one heater, and vice-versa in the other heater depending upon the magnitude and sign of the error signal E. If the commanded attenuation factor K becomes greater than the measured attenuation factor $K_1$ the wave form of current through heater 4 will appear as illustrated in FIGURE 6*a* while the wave form of current through heater 5 will appear as illustrated in FIGURE 6*b*. Under such circumstances the average current through heater 4 is greater than the average current through heater 5, so that thermistor 2 receives increased heat from heater 4 and thermistor 3 receives less heat from heater 5. This results in differential heating of the thermistors so as to raise the measured attenuation factor to the level of the commanded attenuation factor. Conversely, if the commanded attenuation factor K becomes less than the measured attenuation factor $K_1$, the current through heater 4 will have the wave form illustrated in FIGURE 7*a* while the current through heater 5 will have the wave form illustrated in FIGURE 7*b*. Thus, average current through heater 5 will be greater than average current through heater 4, so that thermistor 3 will receive increased heat and thermistor 2 will receive less heat, thereby tending to lower the measured attenuation factor to a level equal to the commanded attenuation factor. Thus, through differential heating due to application of a different amount of power to each heater, the measured attenuation factor may be controlled.

FIGURE 8 illustrates the power correction applied to the attenuator of FIGURE 3 from the Schmitt trigger circuit, assuming identical electrical characteristics of thermistors 2 and 3, and identical electrical characteristics of heaters 4 and 5. It can be seen that for positive error more power is applied to heater 5 than to heater 4 while for negative error more power is applied to heater 4 than to heater 5. For small positive or negative errors power applied to the heaters varies linearly with error. For large positive or negative errors power applied to one heater reaches a maximum while power applied to the other heater reaches a minimum. For zero error, equal power is applied to heaters 4 and 5.

The system of FIG. 3 is preferably used where ambient temperatures may fluctuate. Since power is applied to both heaters at any fixed attenuation level, the attenuator is free from ambient temperature fluctuations of an unheated thermistor.

The invention provides a stable, self-calibrating, voltage controlled attenuator having a substantially flat transmission characteristic for attenuating data-modulated suppressed-carrier signals. The attenuation factor is precisely controlled by means of a D.C. voltage, and the signal waveform and phase are preserved in the output voltage. The attenuator has a large range of controllable resistance, thereby enabling use of wide range gain adjustments. Average power dissipation is minimized through use of pulse modulation.

Although but two embodiments of the invention have been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A self-calibrating attenuator for attenuating a signal by a factor K, comprising a pair of thermistors connected in series and receiving the signal, means connected to a junction between the thermistors for providing an attenuated output, a heater associated with each of the thermistors, and means responsive to the attenuated output for controlling relative energization of the heaters to vary the relative resistance of the thermistors.

2. A self-calibrating attenuator for attenuating a signal by an attenuation factor, comprising a pair of temperature responsive resistors, means for applying an input signal across the resistors, means receiving a portion of the signal appearing across one of the resistors and separating the alternating current and direct current components of the signal whereby the alternating current component comprises the output signal, means combining the direct current component with a command voltage to produce an error voltage, a heater associated with each of the resistors, and switching means for selectively applying the error voltage to the heaters for controlling the relative temperatures of the resistors.

3. The self-calibrating attenuator of claim 2 wherein the switching means includes a first switch responsive to negative error voltages and controlling current flow through one of the heaters, and a second switch responsive to positive error voltages and controlling current flow through the other heater.

4. A self-calibrating attenuator for attenuating a signal by a desired attenuation factor, comprising a pair of thermistors connected in series, modulating means for amplitude modulating a pulse train by the signal, means for applying the modulated signal across the thermistors, means fo receiving and demodulating the portion of signal appearing across one of the thermistors, means for separating the alternating and direct components of the signal whereby the alternating component comprises the output signal, means combining the direct component with a command voltage to produce an error voltage, a heater associated with each thermistor, and switching means applying the error voltage to the heaters for controlling the relative temperatures of the associated thermistors.

5. The self-calibrating attenuator of claim 4 wherein the switching means includes a first switch responsive to negative error voltage and controlling current flow through one of the heaters, and a second switch responsive to positive error voltages and controlling current flow through the other heater.

6. In a self-calibrating attenuator for attenuating an input signal by a desired attenuation factor, the combination comprising a pair of thermistors connected in series, means connected to the thermistors for modulating a pulse train by the input signal, means connected to the thermistors for receiving the signal across one of the thermistors and recovering the modulating signal from the modulated pulse train, means for separating the A.C. and D.C. components of the recovered signal, means combining the D.C. component with a command voltage to produce an error voltage, a heater associated with each of the thermistors, and switch means applying the error voltage to the heater associated with one of said thermistors for controlling temperature of the associated thermistor and the relative resistances of the thermistors.

7. The self-calibrating attenator of claim 6 wherein the switch means includes a first switch responsive to negative error voltages and controlling current flow through one of the heaters, and a second switch responsive to positive error voltages and controlling current flow through the other heater.

8. The self-calibrating attenuator of claim 6 wherein the switch means includes a first switch connected to one of the heaters and a second switch connected to the other heater, and having delayed feedback means connected around the first and second switches as turn-off controls for the switches for varying duration of the error voltage applied to the heaters.

9. A self-calibrating attenuator for attenuating a signal by a desired attenuation factor comprising a pair of temperature responsive resistors connected in series, means for applying an input signal across the resistors, means receiving the portion of signal appearing across one of the resistors and separating the A.C. and D.C. components of the signal, means combining the D.C. component with a command voltage to produce an error voltage, and switch means receiving the error voltage and controlling the relative temperatures of the resistors.

10. A self-calibrating attenuator for attenuating a signal by a desired attenuation factor comprising a pair of thermistors connected in series, a pulse modulator connected to the thermistors and modulating a pulse train by the signal, a demodulator connected to a junction between the thermistors for removing pulses from the signal, a decoupler connected to the detector and separating the A.C. and D.C. components of the demodulated signal, means connected to the decoupler for combining the D.C. component with a command voltage to produce an error voltage, a heater associated with each of the thermistors, and switching means responsive to the error voltage and connected to the heaters for applying power to either heater depending upon the amplitude and sign of the error voltage to control the temperatures of the thermistors.

11. A self-calibrating attenuator for attenuating a signal by a desired attenuation factor comprising a pair of thermistors connected in series, a pulse amplitude modulator connected to the thermistors for amplitude modulating a pulse train by the signal, an envelope detector connected to a junction between the thermistors for recovering the modulating signal from the amplitude modulated pulse train, a decoupler connected to the envelope detector for separating the A.C. and D.C. components of the recovered signal, circuit means connected to the decoupler and combining the D.C. component with a command voltage to produce an error voltage, a heater associated with each of the thermistors, and switching means responsive to the error voltage and connected to the heaters for applying power to the heaters in accordance with the amplitude and polarity of the error voltage to control the temperatures of the thermistors.

12. A self-calibrating attenuator for attenuating a signal by a desired attenuation factor comprising a pair of temperature responsive resistors connected in series, means connected to the resistors and applying an input signal across the resistors, means connected to a junction between the resistors and producing an output signal and a feedback signal, means combining the feedback signal with a command voltage to produce an error voltage, a heater associated with each of the resistors, and trigger circuit means responsive to the error voltage and applying power to each of the heaters for a length of time dependent upon the magnitude and sign of the error voltage for controlling the thermistor temperatures.

13. A self-calibrating attenuator for attenuating a signal by a desired attenuation factor comprising a pair of thermistors connected in series, means connected to the thermistors for applying an input signal across the thermistors, means connected to a junction between the thermistors and producing an A.C. output signal and a D.C. feedback signal from the portion of signal appearing across one of the thermistors, means combining the D.C. signal with a command voltage to produce an error voltage, a heater associated with each of the thermistors, and trigger circuit means responsive to the error voltage and applying power to each of the heaters for a length of time dependent upon the magnitude and sign of the error voltage for controlling the thermistor temperatures.

14. A self-calibrating attenuator for attenuating a signal by a desired attenuation factor comprising a pair of thermistors connected in series, means connected to the thermistors for amplitude modulating a pulse train by the signal, an envelope detector connected to a junction between the thermistors for recovering the modulating signal from the modulated pulse train, decoupler means connected to the envelope detector for separating the A.C. and D.C. components of the recovered signal, means combining the D.C. component with a command voltage to produce an error voltage, a heater associated with each of the thermistors, and a trigger circuit responsive to the error voltage and connected to the heaters for applying power to the heaters for a length of time dependent upon the amplitude and sign of the error voltage for controlling the thermistor temperatures and relative resistance of the thermistors.

15. A self-calibrating attenuator for attenuating a signal by a factor K, comprising a pulse amplitude modulator for receiving the signal and providing a pulse train amplitude modulated by the signal, a pair of thermistors connected in series to the pulse amplitude modulator and receiving the amplitude modulated pulse train, an envelope detector connected to a junction between the thermistors for demodulating the attenuated signal, a decoupler for separating the alternating and direct current components of the attenuated signal, means for combining the direct current component with a command voltage to produce an error voltage, a heater associated with each of the thermistors, and switching means responsive to the error voltage and controlling energization of the heaters in accordance with the amplitude and polarity of the error voltage to control the thermistor temperatures and relative resistances of the thermistors.

16. A self-calibrating attenuator for attenuating a signal $e_i$ by a factor K, comprising a pair of thermistors connected together and receiving the signal, means connected to the thermistors for providing an attenuated output and a feedback voltage, a heater associated with each of the thermistors, a source of attenuation command voltage, and means responsive to the difference between the feedback voltage and attenuation command voltage for controlling relative energization of the heaters in accordance with the polarity of the difference voltage to vary the relative resistances of the thermistors to provide an output $e_iK$.

17. A self-calibrating attenuator for attenuating a signal by an attenuation factor, comprising means for modulating a train of pulses by the signal, a pair of temperature responsive resistors connected to the modulating means and receiving the train of modulated pulses, detector means connected between the resistors and providing an attenuated output signal and a feedback signal, means combining the feedback signal with a command voltage to produce an error voltage, and means receiving the error voltage and heating the resistors to change the relative resistances of the resistors in accordance with the error voltage.

18. A self-calibrating attenuator for attenuating a signal by an attenuation factor, comprising a modulator for pulse modulating the signal, temperature responsive resistance means connected to the modulator and receiving the modulated pulses, detector means connected to the resistance means and receiving a portion of the pulse modulated signal determined by the relative temperatures of the resistance means, means connected to the detector means for producing an output voltage and an error voltage, and means receiving the error voltage and controlling the relative temperatures of the resistance means in accordance with the polarity of the error voltage.

19. A self-calibrating attenuator for attenuating a signal by an attenuation factor, comprising means receiving the signal for providing a pulse modulated signal, a pair of temperature responsive resistors connected to said pulse modulating signal means, means connected to the resistors and receiving a portion of the modulated signal for demodulating the signal portion, a heater associated with each of the resistors, and circuit means connected to the demodulating means and to the heaters for providing an output and for combining the demodulated signal portion with a command voltage to produce an error voltage and including means for applying the error voltage to the heater associated with one of the resistors in accordance with the polarity of the error voltage to control the relative resistances of the resistors.

References Cited by the Examiner

UNITED STATES PATENTS

| | | | |
|---|---|---|---|
| 2,660,625 | 11/53 | Harrison | 323—69 |
| 2,839,740 | 6/58 | Haanstra | 323—81 |

LLOYD McCOLLUM, *Primary Examiner.*